United States Patent Office 2,845,450
Patented July 29, 1958

2,845,450
CHEMICAL PRODUCTS FROM BARK

James K. Anderson, Franklin W. Herrick, and Kenneth Russell Gray, Shelton, Wash., assignors to Rayonier Incorporated, Shelton, Wash., a corporation of Delaware No Drawing. Application September 13, 1955
Serial No. 534,146

4 Claims. (Cl. 260—473.5)

This invention relates to chemical derivatives from the bark of trees, and has for its object the provision of a new chemical product derived from tree bark. The bark from many species of trees contains a complex aggregation of organic compounds some of which are soluble in warm water, others are soluble in organic solvents, and still others can be rendered water-soluble by digestion in aqueous solutions of alkali metal hydroxides or sulfites, most effectively at elevated temperatures. However, the greater portion of the phenolic materials in the bark are not soluble in most organic solvents. We have discovered that important organic compounds can be recovered from bark in high yield by reacting the bark with a low-molecular weight monohydric alcohol in the presence of an acid catalyst.

The bark derivatives of our invention are compounds containing phenolic groups which are soluble in organic solvents such as alcohols and ketones, insoluble in water, and are reactive by heating them with phenol-formaldehyde condensates to form insoluble infusible resinous products. The bark derivatives are highly colored, amorphous, and the nucleus without the carboxyl group has an equivalent weight which approximates the equivalent weight of catechol, resorcinol, or guaiacol. Without any attempt to predicate the invention on any theory as to the chemical structure of the bark derivatives, it appears that they are phenolic esters of relatively simple structure, possibly esters of polyhydric phenolic acids.

Since the phenolic esters of the invention are compatible with phenol-formaldehyde condensates and react with such condensates they can be used very effectively as a substitute for a substantial part of the phenol normally used for this purpose with technical and economic advantages. Compositions of bark phenolic esters and phenol-formaldehyde condensates are especially effective as laminating resins and coatings. Phenol-formaldehyde adhesive resins composed of equal parts of phenol-formaldehyde condensate and bark phenolic ester have properties equivalent to those resins made from phenol-formaldehyde resins alone.

The water commonly used as solvent for the usual phenol-formaldehyde resins of commerce, which are water or water and alkali soluble, causes cellulosic fibers such as those of wood or paper to swell. Phenol-formaldehyde resins including the compounds of the invention have the important property of being soluble in organic solvents and hence they can penetrate such materials as wood, paper and the like, without swelling or distorting the fibers. This important advantage over the water-soluble phenol-formaldehyde resins is due to the non-wetting of the fibers with water.

We have found that the new phenolic esters derived from bark may be formed and separated from the solid bark residue by treating substantially dry bark with a low molecular weight monohydric alcohol, advantageously containing from one to four carbon atoms, and an acid catalyst in a process referred to herein as "alcoholysis."

We prefer to agitate finely-divided bark with a solution of the alcohol and acid in the practical absence of water at an elevated temperature, such as at refluxing temperature, to convert various of the complex compounds to phenolic esters which dissolve in the alcohol.

By this process, the complex organic compounds are broken down and converted to relatively simple esters of the phenolic acids leaving a residue of complex solid bark material. The esters of the phenolic acids are soluble in the alcohol used in the process and can be separated readily in the alcohol solution from the bark residue. The alcohol is separated from the solid residue in any suitable way as by expressing, centrifuging, etc., and the alcohol can be recovered by evaporation for reuse, leaving an amorphous highly colored product which we believe to be largely phenolic esters. The product can be dissolved in many organic solvents.

By way of illustrating some of the structural characteristics of the phenolic esters derived from western hemlock bark, the product of preparation with n-butanol and hydrochloric acid had a saponification number of 220. Since this is a butyl-ester the equivalent weight of the corresponding acid would be 220−56=164. The nucleus with the carboxyl group would have an equivalent weight of 164−44=120, which approximates the molecular weight of catechol, resorcinol, or guaiacol.

It has been found that barks of a wide variety of trees, including barks of softwood and hardwood trees, can be used as raw material in the preparation of the products of this invention. The following table gives a list of barks and the yields of phenolic esters derived therefrom which are based on the weight of dry bark resulting from the treatment of the barks with n-butanol and an acid by the process described in Example I.

TABLE 1

| Bark Species | Phenolic Ester Yield, percent |
|---|---|
| Southern yellow pine (Pinus echinata, Pinus palustris, Pinus taeda, Pinus caribaea, Pinus elliotti and Pinus rigida var. serotina) | 23.8 |
| Black gum (Nyssa silvatica) | 34.4 |
| Western red cedar (Thuja plicata) | 28.6 |
| White fir (Abies amabillis) | 23.0 |
| Sweet gum (Liquidambar styraciflua) | 28.2 |
| Southern magnolia (Magnolia grandiflora) | 23.0 |
| Red Alder (Alnus rubra) | 30.0 |
| Big leaf maple (Acer macrophylum) | 14.8 |
| Southern red oak (Quercus velutina, Quercus falcata, Quercus phellas and Quercus nigra) | 23.2 |
| Black cottonwood (Populus trichocarpa) | 35.8 |
| Western hemlock (Tsuga heterophylla) | 24.25 |
| Douglas fir (Pseudotsuga taxifolia, now called Pseudotsuga menziesii) | 35.4 |
| Sitka spruce (Picea sitchensis) | 38.4 |

In producing the compounds of the invention, any monohydric aliphatic alcohol of from one to preferably not more than four carbon atoms can be used. While alcohols containing more than four carbon atoms can be used, the results are not as effective or economical as the preferred lower alcohols. Mineral acids including hydrochloric acid, sulfuric acid and phosphoric acid can be used. In addition, aromatic sulfonic acids, such as p-toluene sulfonic acid, can be used.

The dihydric and multihydric alcohols as a class are not desirable for at least two reasons:
(1) Difficulty of polyol recovery.
(2) High viscosity of product, low alcohol solubility and apparent higher molecular weight, possibly due to polymerization of the resin.

The preferred alcohol is n-butanol because of its availability and ease of recovery. The alcoholysis is advantageously carried out by suspending the finely divided bark in the alcohol containing an acid catalyst and heating the mixture for a suitable time. Following the heating period the reaction mixture is filtered and pressed to separate the alcohol solution from the unreacted bark residue, and the solution is vacuum evaporated and steam distilled to remove excess alcohol. The product is an amorphous solid of dark color which is readily soluble in such solvents as methanol, ethanol, isopropanol, butanol, acetone, methylethyl ketone, dioxane or dimethyl formamide. Although insoluble in water the product is soluble in aqueous solution of alkalies due to the presence of phenolic hydroxyl groups.

The following examples illustrate the preparation of the bark phenolic esters of this invention.

*Example 1*

A glass reaction vessel equipped with mechanical stirrer and reflux condenser was charged with 1400 parts of a 2.5 N solution of hydrochloric acid in n-butanol, 4350 parts of n-butanol and 1555 parts of hemlock bark containing 3.6% moisture and ground to pass a 12 mesh sieve. While stirring the reaction mixture was heated to reflux in one hour and was maintained at reflux for 3.5 hours. The reaction mixture was then cooled and pressed in a 40 x 60 mesh screen at 150 p. s. i. to separate the alcohol solution from the insoluble bark residue. The press residue was washed with 4000 parts of n-butanol and the combined butanol solutions were filtered to remove fine suspended material. Butanol was then removed from the filtrate by steam distillation. The product remained as an amorphous solid which was filtered from the aqueous residue of the distillation and dried. Yield of dry product was 365 parts or 24.25% of the dry bark.

*Example 2*

A glass reaction vessel equipped with mechanical stirrer and reflux condenser was charged with 2025 parts of n-butanol, 100 parts of sulfuric acid and 500 parts of hemlock bark ground to pass a 12 mesh sieve. While stirring the reaction mixture was heated to reflux in one hour and 10 minutes, and maintained at that temperature (117° C.) for 3.5 hours. The reaction mixture was then cooled and filtered with the aid of a "Celite" filter to remove undissolved bark residue. The filtrate was washed with 2000 parts of water and then steam distilled to remove butanol. The remaining product was removed by filtration and dried. The yield was 128 parts or 25.66% of the dry bark.

*Example 3*

A glass reaction flask equipped with mechanical stirrer and reflux condenser was charged with 2025 parts of n-butanol, 86 parts of anhydrous calcium chloride, 77 parts of sulfuric acid, and 500 parts of dry hemlock bark, ground to pass a 12 mesh sieve. The reaction mixture was stirred and heated to 117° C. and maintained at that temperature for 3.5 hours. The undissolved bark residue was removed by filtration and the butanol was removed from the filtrate by steam distillation. The product was obtained by filtration of the aqueous residue. The yield was 136 parts or 27.2% of the dry bark.

*Example 4*

A glass reaction vessel equipped with mechanical stirrer and reflux condenser was charged with 500 parts of ground hemlock bark, 1973 parts of anhydrous ethanol and 50 parts of anhydrous hydrogen chloride. While stirring, the reactive mixture was heated to 78° C. and maintained at that temperature for 4 hours. The undissolved bark residue was removed by filtration and the ethanol was removed by distillation by the injection of steam. The product was obtained by filtration of the aqueous residue. The yield was 99 parts by weight or 19.67% of the dry bark.

The bark phenolic esters were used to formulate phenol-formaldehyde adhesive resins, especially effective for laminating by dissolving various ratios of bark phenolic ester and an acid condensed phenol-formaldehyde composed of one mol of phenol condensed with 1.5 moles of formaldehyde in methanol to give a solution containing 43% solids. This was applied to laminating paper and the laminates were dried to 3–5% volatiles and pressed at 150° C. and 1500 p. s. i. for 30 minutes. The following table lists the physical test on the laminates obtained.

TABLE II

| Bark Species | Percent PF in Resin Mixture | Percent Resin in Laminate | Flexural Strength Modulus of Rupture | Tensile Strength | Impact Strength | Percent Water Absorption |
|---|---|---|---|---|---|---|
| W. Hemlock | 100 | 39.8 | 23,100 | 14,800 | 0.55 | 1.2 |
| W. Hemlock | 50 | 36.3 | 19,250 | 11,050 | 0.53 | 1.7 |
| So. Pine | 55.5 | 30.6 | 16,000 | 10,000 | 0.353 | 3.1 |
| So. Pine | 60 | 33.3 | 19,850 | 12,200 | 0.573 | 1.7 |
| So. Pine | 50 | 34.7 | 22,000 | 14,400 | 0.569 | 1.5 |
| So. Pine | 44.5 | 34.0 | 21,500 | 14,900 | 0.554 | 1.0 |
| Red Alder | 54.5 | 35.5 | 25,350 | | | 2.1 |
| Red Alder | 50 | 33.6 | 24,700 | | | 2.2 |

The solutions containing mixtures of bark phenolic ester and phenol-formaldehyde condensate are also useful as baking enamels for the coating of metals. They can be used as adhesives for bonding metal to metal, metal to paper and metal to wood. They can also be used as components of molding compositions. The bark phenolic esters are of economic interest because of the enormous quantity of bark available for conversion and extraction. They are particularly economical because they can replace a large portion of the more expensive phenol used in phenolic resins normally used for adhesives and other purposes.

We claim:

1. A water-insoluble phenolic ester product derived from tree bark by reacting substantially dry bark with a heated monohydric alcohol having from 1 to 4 carbon atoms in the presence of an acid catalyst resulting in an alcoholysis of a portion of the bark, and separating the product from the bark residue in solution in the alcohol.

2. The process of forming a water-insoluble phenolic ester product from tree bark which comprises reacting the bark in a substantially dry state with a monohydric alcohol having from 1 to 4 carbon atoms at an elevated temperature and in the presence of an acid catalyst to form said product by acid alcoholysis, and dissolving said product in the alcohol.

3. In the process of claim 2, reacting the bark with n-butanol and a strong mineral acid of the group consisting of hydrochloric acid, sulfuric acid, and phosphoric acid as catalyst.

4. In the process of claim 2, reacting the bark with n-butanol and an aromatic sulfonic acid as catalyst.

References Cited in the file of this patent

UNITED STATES PATENTS

| | | |
|---|---|---|
| 510,132 | Hagemann | Dec. 5, 1893 |
| 876,311 | Hildebrandt | Jan. 7, 1908 |
| 2,483,099 | Morris et al. | Sept. 27, 1949 |